W. R. COCHRAN.
DIRIGIBLE LAMP SUPPORT.
APPLICATION FILED JAN. 15, 1914.
1,108,339.
Patented Aug. 25, 1914.
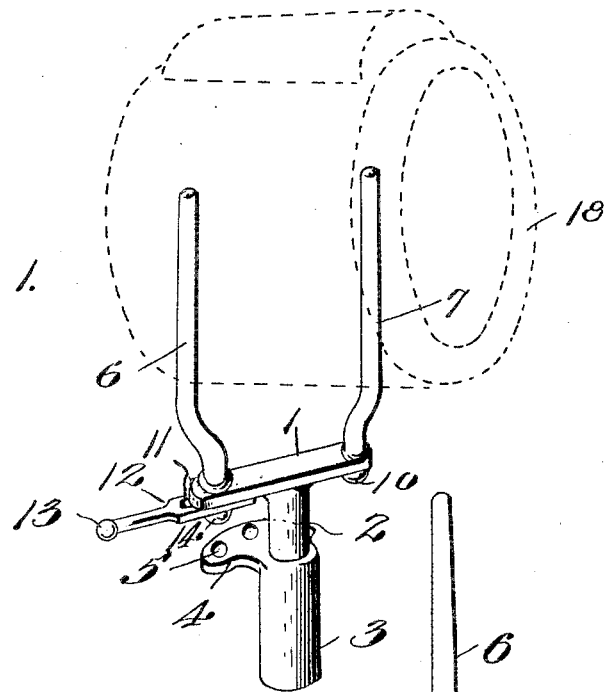
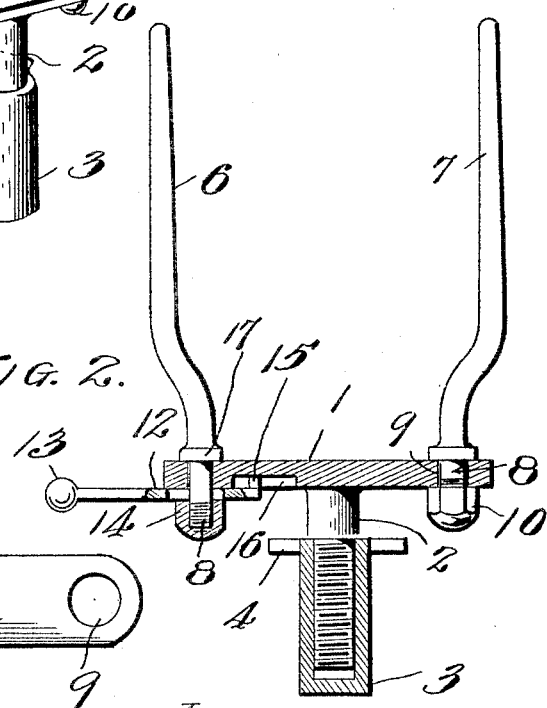
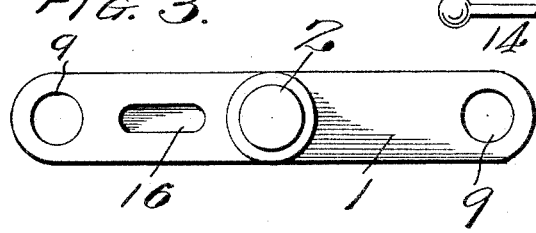
WITNESSES.
C. K. Davies
M. L. Newcomb
INVENTOR
WALTER R. COCHRAN
By Herman A. Phillips
Attorney.

UNITED STATES PATENT OFFICE.

WALTER RAYMOND COCHRAN, OF BIGGSVILLE, ILLINOIS.

DIRIGIBLE LAMP-SUPPORT.

1,108,339.      Specification of Letters Patent.      Patented Aug. 25, 1914.

Application filed January 15, 1914. Serial No. 812,322.

*To all whom it may concern:*

Be it known that I, WALTER R. COCHRAN, a citizen of the United States, residing at Biggsville, in the county of Henderson and State of Illinois, have invented certain new and useful Improvements in Dirigible Lamp-Supports, of which the following is a specification.

The present invention relates to improvements in dirigible lamp supports, and is particularly designed for use in connection with headlights for automobiles and other vehicles.

The object of the invention is to provide a dirigible lamp connection (actuated from the steering device) that is simple, inexpensive, durable and efficient in operation; and a further object is the provision of a lamp support that is adjustable to different sized lamps, in order that lamps of varying sizes may be used upon the single support.

The invention consists in a novel combination of elements connecting the lamp with the steering device as will be hereinafter pointed out and embodies an adjustable supporting arm and particular means for holding said arm in adjusted position to adapt the support for varying sizes of lamps.

In the accompanying drawings I have illustrated one complete example of the physical embodiment of my invention constructed according to the best mode I have so far devised for the practical application of the principles.

Figure 1 is a perspective view of the lamp support and showing in dotted lines a lamp, to illustrate its connection with the support. Fig. 2 is an elevation, with parts in section, of the support, and Fig. 3 is a plan view of the under side of the bracket of the support.

In the preferred embodiment of my invention as illustrated in the drawings, I employ a T-shaped bracket 1 having a threaded pintle 2, which is adapted to screw into a socket 3, threaded for the purpose. This metallic socket 3 is provided with a flange or head 4 provided with perforations 5 by means of which the socket may be secured to a supporting member for the arm located at the forward end of the automobile or vehicle. The bracket 1 is devised to support the posts or arms 6 and 7. These arms 6 and 7 are identical in structure and are interchangeable, each having a threaded end 8 passed through an opening 9 near each end of the bracket, and the nuts 10 and 14 at the under side of the bracket are employed to immovably clamp the posts in the bracket. The posts are adjustable in the bracket and may be turned toward or away from each other. A slidable lever plate 12, slotted at 11, is formed with a handle or ball 13, and is located directly beneath one end of the bracket 1. The lever plate 12 is slidable along the under face of the bracket 1, but the plate is held to the bracket by means of the nut 14 which clamps the plate between itself and the bracket. The end of the plate opposite the ball 13 is provided with an upwardly projecting lug 15, movable in a groove 16 in the lower face of the bracket 1.

The posts 6 and 7 are adjustable with relation to each other, and because of the presence of the bends in the posts, they may be turned to adapt them to different sized lamps. Thus, after the holding nuts 10 and 14 have been loosened, the posts may be turned in the bracket, each to the same corresponding position toward or away from each other to decrease or increase the distance between them in order to adapt them to a smaller or larger lamp. After the posts have been turned to proper position they may be clamped by means of the nuts 10 and 14 as will be readily understood.

The adjustment of the plate 12 will be evident from the showing in Fig. 2. If it is desired to move the plate, the nut 14 is turned loose, and then by means of the ball 13, the plate is bodily slid in toward the pintle 2, to the desired position. The nut is then turned on the threaded end 8 of the post, and the plate is clamped and fixed between the nut and the bracket, and the post is rigidly held between the nut and the flange or shoulder 17 on the post.

In Fig. 1 a lamp is indicated in dotted lines at 18, and this is provided with the usual attaching means for supporting the lamp on the posts 6 and 7.

From the above description taken in connection with the drawings it is evident that the lamp support is simple in construction and operation and quickly attachable for different sized lamps, and that the device as a whole possesses merit to render it of value for use in connection with the supporting of lamps on vehicles. All parts of the device are, of course, constructed of metal, and the pintle 2 which is threaded in the socket 3 is rotatable therein, it being understood that the pintle is loosely secured into the socket in order to permit the rotation of the pintle in the socket. The ball 13 forms part of a ball and socket joint with a connecting rod (not shown) which is suitably connected to a movable part of the steering gear of the automobile. Thus, when the steering gear is moved, a corresponding rotary movement is imparted to the bracket 1 through the lever 12. And the light is thrown in the direction that the front wheels of auto are going so that the driver can see plainly whatever might be in his way when turning and going around corners. By means of the slotted connection between the lever 12 and bracket, the leverage may be adjusted as desired.

It is evident from the above description that the purposes and objects of my invention are fulfilled in the device as set forth.

Having thus fully described my invention, what I claim as new and desire to secure by Letters Patent, is:

The combination in a dirigible lamp with a perforated bracket, a socket and a pintle and a lamp post fitted in and having a threaded end extending through the bracket, of a slotted lever arm fitted over said post and formed with an end lug, said bracket having a groove to receive the lug, and a nut for clamping said arm and post to the bracket.

In testimony whereof I affix my signature in presence of two witnesses.

WALTER RAYMOND COCHRAN.

Witnesses:
   ALBERT P. McHENRY,
   MABEL E. PEARSON.